United States Patent [19]

Huang

[11] Patent Number: 5,772,524
[45] Date of Patent: Jun. 30, 1998

[54] WATER RETARDING GOLF CLUB GRIP

[76] Inventor: Ben Huang, 19472 Woodlands La., Huntington Beach, Calif. 92648

[21] Appl. No.: 656,942

[22] Filed: Jun. 14, 1996

Related U.S. Application Data

[63] Continuation-in-part of Ser. No. 637,931, Jan. 14, 1991, abandoned, Ser. No. 890,383, May 26, 1992, abandoned, Ser. No. 953,190, Sep. 29, 1992, abandoned, Ser. No. 58,313, May 3, 1993, abandoned, Ser. No. 278,186, Jul. 21, 1994, Pat. No. 5,397,123, Ser. No. 542,009, Nov. 13, 1995, Pat. No. 5,645,501, Ser. No. 567,339, Dec. 28, 1995, abandoned, and Ser. No. 595,445, Feb. 26, 1996, abandoned.

[51] Int. Cl.$^6$ .................................................. A63B 49/08
[52] U.S. Cl. .......................... 473/300; 473/301; 473/549
[58] Field of Search ................................... 473/300, 301, 473/302, 549, 550, 551, 568

[56] References Cited

U.S. PATENT DOCUMENTS

| | | |
|---|---|---|
| 1,139,843 | 5/1915 | Brown . |
| 1,447,989 | 3/1923 | Kinsman . |
| 1,556,781 | 10/1925 | Gjorup . |
| 1,701,856 | 2/1929 | Kraeuter . |
| 1,940,104 | 12/1933 | Russell et al. ............................. 273/81 |
| 1,943,399 | 1/1934 | Smith ....................................... 273/81 |
| 2,003,917 | 6/1935 | Bowden .................................... 273/75 |
| 2,046,164 | 6/1936 | Herkner .................................... 273/81 |
| 2,086,062 | 7/1937 | Bray ......................................... 273/81 |
| 2,166,044 | 7/1939 | Fletcher .................................... 273/75 |
| 2,166,045 | 7/1939 | Fletcher .................................... 273/75 |
| 2,513,655 | 7/1950 | Lamkin et al. ........................... 273/81 |
| 2,649,605 | 11/1953 | LeTourneau . |
| 2,737,503 | 3/1956 | Sprague et al. . |
| 3,582,456 | 6/1971 | Stolki ....................................... 161/165 |
| 3,654,066 | 4/1972 | Fukushima et al. ..................... 161/160 |
| 3,845,954 | 11/1974 | Case ......................................... 273/75 |
| 3,848,480 | 11/1974 | Oseroff et al. .......................... 74/558.5 |
| 3,848,871 | 11/1974 | Sweet et al. ............................. 273/75 |
| 3,860,469 | 1/1975 | Gregorian et al. ....................... 156/63 |
| 3,881,521 | 5/1975 | Johansen et al. ........................ 138/126 |
| 3,899,172 | 8/1975 | Vaughn et al. ........................... 273/73 |
| 4,015,851 | 4/1977 | Pennell ..................................... 273/75 |
| 4,044,625 | 8/1977 | O'Haem .................................. 74/558.5 |
| 4,070,020 | 1/1978 | Dano ........................................ 273/73 |
| 4,100,006 | 7/1978 | Buckley ................................... 156/78 |
| 4,133,529 | 1/1979 | Gambino . |
| 4,159,115 | 6/1979 | Ticktin et al. . |
| 4,174,109 | 11/1979 | Gaiser .................................... 273/81.6 |
| 4,284,275 | 8/1981 | Fletcher ................................... 273/75 |
| 4,347,280 | 8/1982 | Lau et al. ............................. 428/304.4 |
| 4,454,187 | 6/1984 | Flowers et al. ......................... 428/159 |
| 4,567,091 | 1/1986 | Spector ................................... 428/222 |
| 4,647,326 | 3/1987 | Pott ......................................... 156/77 |
| 4,660,832 | 4/1987 | Shomo .................................... 273/73 |
| 4,662,415 | 5/1987 | Proutt ...................................... 150/52 |
| 4,736,949 | 4/1988 | Muroi ...................................... 273/73 |
| 4,765,856 | 8/1988 | Doubt ..................................... 156/212 |
| 4,853,054 | 8/1989 | Turner et al. ............................ 156/78 |
| 4,934,024 | 6/1990 | Sexton, I ................................. 16/111 |
| 5,042,804 | 8/1991 | Uke .......................................... 273/75 |
| 5,110,653 | 5/1992 | Landi ..................................... 428/116 |
| 5,274,846 | 1/1994 | Kolsky . |
| 5,275,407 | 1/1994 | Soong ..................................... 273/73 |

FOREIGN PATENT DOCUMENTS

| | | |
|---|---|---|
| 2398099 | 7/1977 | France . |
| 2805314 | 8/1979 | Germany . |
| 3414978 | 10/1985 | Germany . |
| 458367 | 6/1935 | United Kingdom . |
| 443228 | 2/1936 | United Kingdom . |
| 870021 | 6/1961 | United Kingdom . |
| 979242 | 1/1965 | United Kingdom . |

*Primary Examiner*—William M. Pierce
*Attorney, Agent, or Firm*—Fulwider Patton Lee & Utecht, LLP

[57] ABSTRACT

A water retarding golf club grip having an outer shock absorbing polyurethane layer, an intermediate water resistant layer, and an inner felt layer, such layers being bonded together to define an elongated resilient strip which is spirally wrapped about the grip-receiving portion of a golf club shaft by a double-sided adhesive watertight tape adhered to the underside of the felt layer with the side edges of the tape being bent upwardly over the sides of the strip to restrain entry of water into the felt layer.

11 Claims, 5 Drawing Sheets

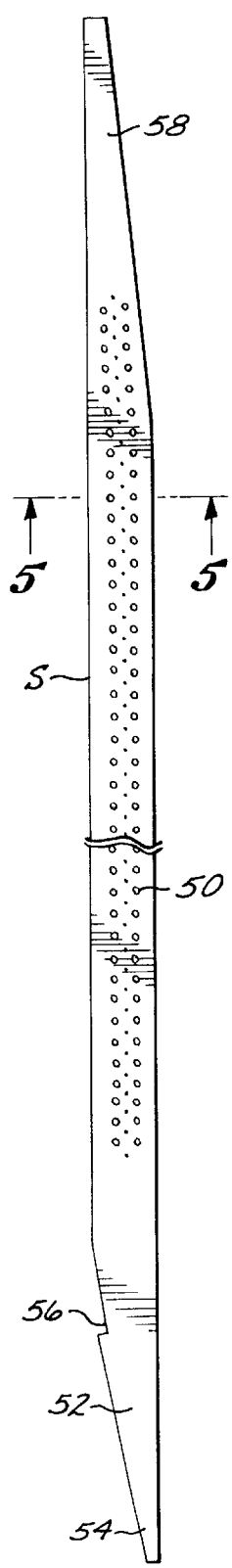
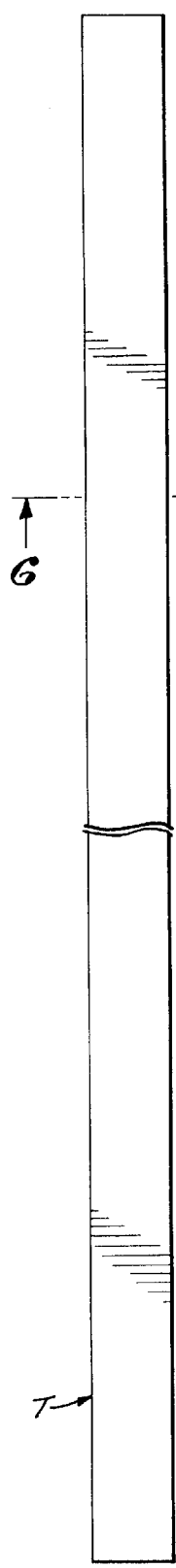
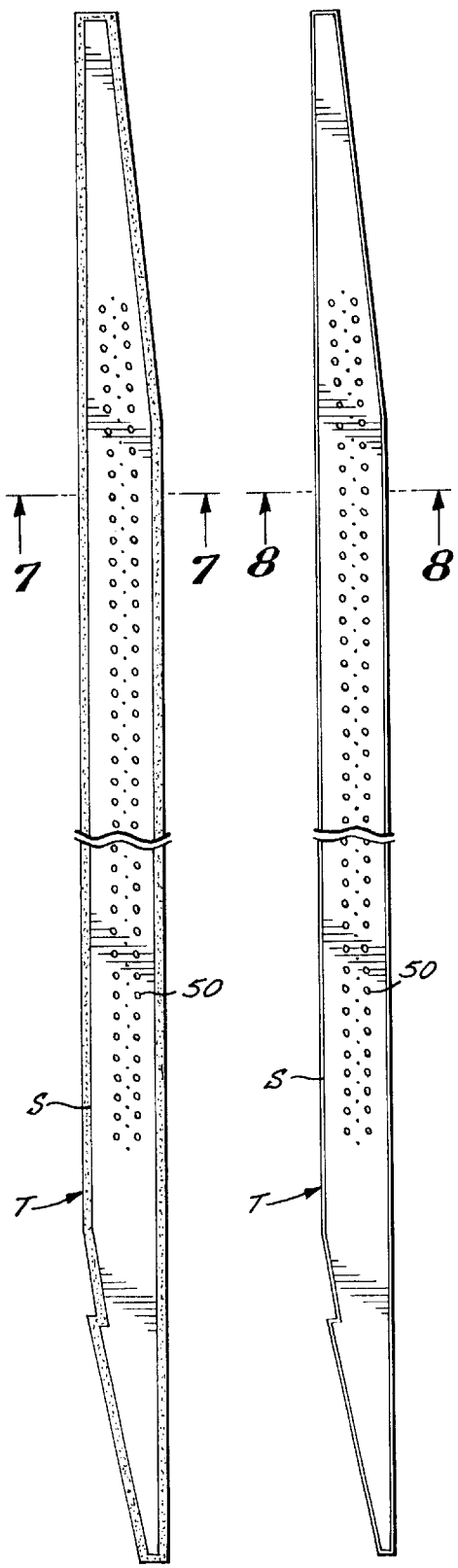
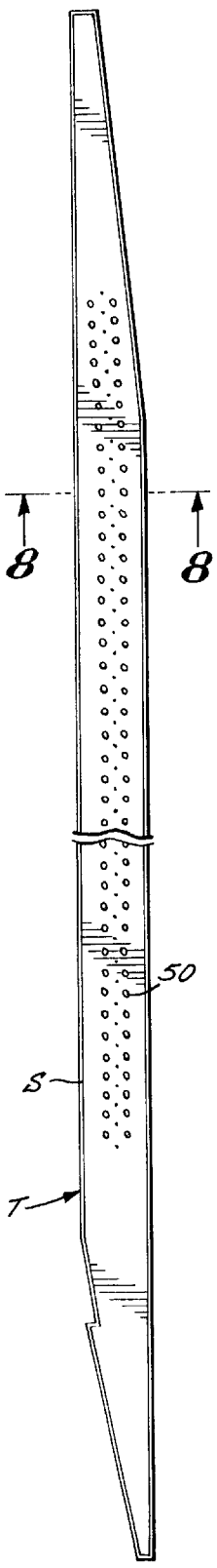

U.S. Patent    Jun. 30, 1998    Sheet 3 of 5    5,772,524
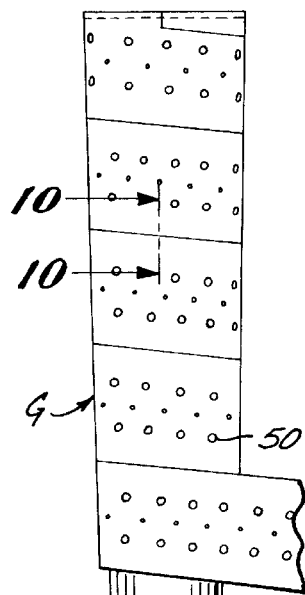
FIG. 9
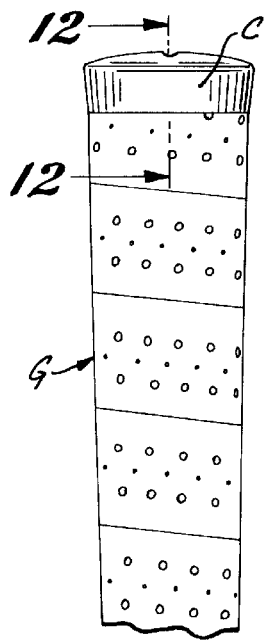
FIG. 11
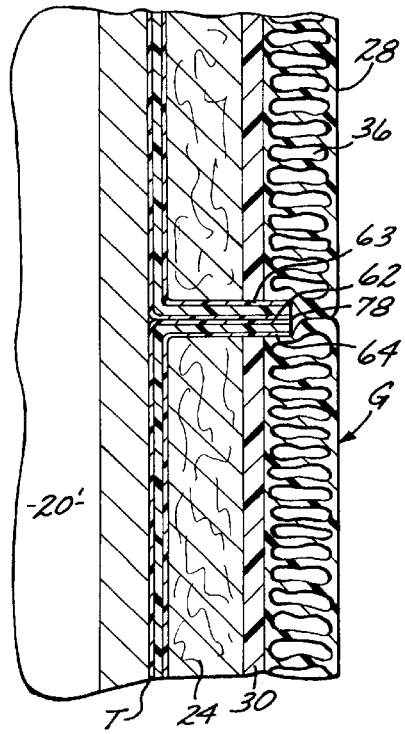
FIG. 10
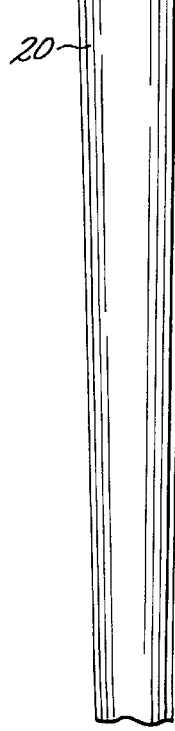
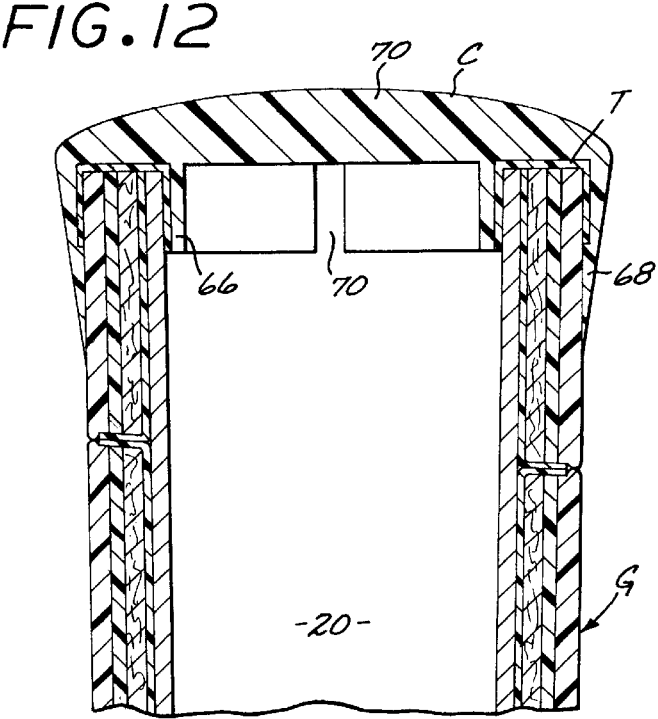
FIG. 12

FIG.13
FIG.14
FIG.15
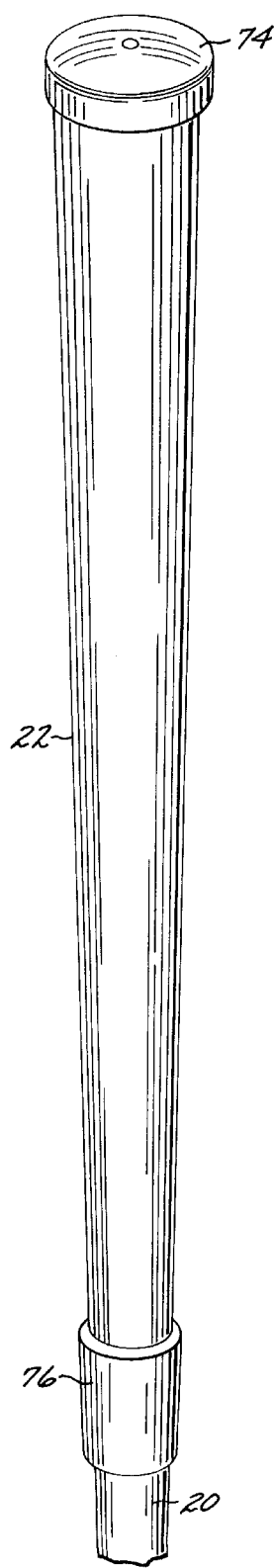
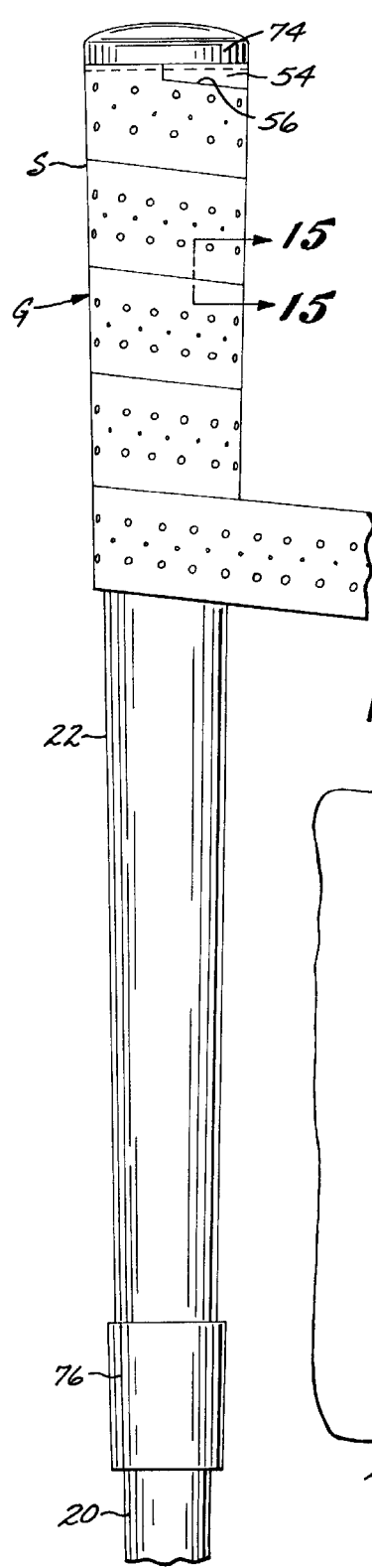
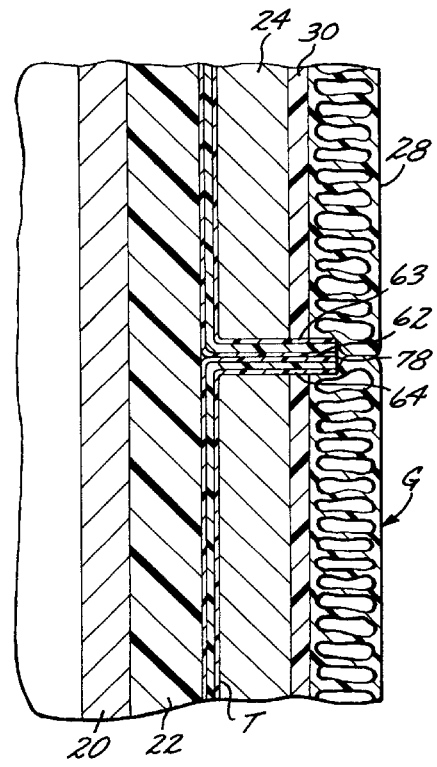

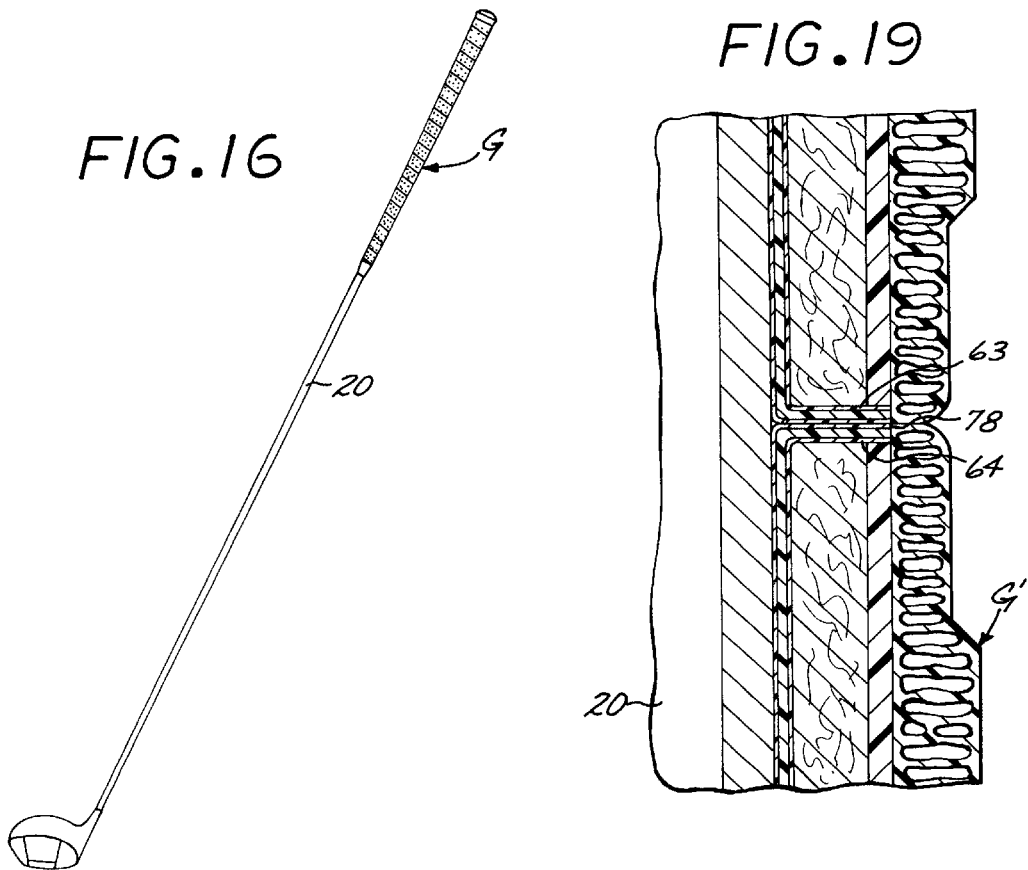

WATER RETARDING GOLF CLUB GRIP

This is a continuation-in-part of applications

Ser. No. 07/637,931 filed on Jan. 14, 1991 (now abandoned)

Ser. No. 07/890,383 filed on May 26, 1992 (now abandoned)

Ser. No. 07/953,190 filed on Sep. 29, 1992 now abandoned

Ser. No. 08/058,313 filed on May 3, 1993 now abandoned

Ser. No. 08/278,186 filed on Jul. 21, 1994 (U.S. Pat. No. 5,397,123)

Ser. No. 08/542,009 filed on Nov. 13, 1995 (U.S. Pat. No. 5,645,501)

Ser. No. 08/567,339 filed on Dec. 18, 1995

Ser. No. 08/595,445 filed on Feb. 26, 1996 (now abandoned).

BACKGROUND OF THE INVENTION

The present invention relates to golf club grips and more particularly to a water retarding golf club grip which permits a golfer to continue his golf game even during rainy conditions.

It is well known that shock generated by impact between a golf club and a golf ball can adversely affect muscle tissue and arm joints such as elbow joints. The energy generated by such shock is usually of high frequency and short duration with rapid decay, and which is often known as "impact shock." Tight grasping of a grip to keep it from slipping contributes to the shock to the muscle tissue and arm joints of the users golf clubs. Applicant has previously developed resilient grips which successfully reduce shock to the muscle and arm joints of the users of golf clubs, tennis racquets, racquet ball racquets, baseball bats, and other impact imparting devices. See for example, U.S. Pat. No. 5,397,123 granted to applicant Mar. 14, 1995, and U.S. Pat. No. 5,584,482 granted to applicant Dec. 17, 1996 on application Ser. No. 08/507,575, of which this application is a continuation-in-part, and the disclosures of which patents are embodied herein by reference. Such earlier grips utilize a polyurethane layer bonded to a felt layer to define an elongated strip which is spirally wrapped around the handle of a racquet or golf club to conform to the external configuration of such handle or to a resilient sleeve adhered to such handle. In such earlier grips of applicant's design, the thickness of the polyurethane layer relative to the thickness of the felt layer as compared to prior art resilient grips, i.e. the ratio of the thickness of the polyurethane layer to the thickness of the felt layer was a minimum of approximately 0.18. By utilizing such ratio, applicant's grips increased shock resistance over prior art grips and provided adequate tackiness to a user's hand so as to permit a user to maintain a tight grasp of the golf club or racquet, while reducing slippage of the racquet relative to the user's hands. It has been found that under rainy conditions however, a user's hands tended to slip relative to such grips with resultant diminished control of the golf club.

SUMMARY OF THE INVENTION

Applicant has developed a water retarding golf club grip which permits a golfer to continue playing even during rainy conditions. Such water retarding grip utilizes applicant's previously developed concept of a bonded-together layers of polyurethane and felt, wherein the ratio of the thickness of the polyurethane layer to the thickness of the felt layer is a minimum of approximately 0.18, and the polyurethane layer is formed with perforations that enhance perspiration absorbance of the grip. The water retarding grip of the present invention additionally utilizes a thin water resistant polyurethane layer interposed between the felt layer and the outside polyurethane layer, with the three layers being bonded together. The resultant strip is spirally wrapped about the grip-receiving portion of a golf club shaft or alternatively about a rubber-like resilient sleeve which covers the grip-receiving portion of a golf club shaft and adhered in place by a double-sided adhesive tape attached to the underside of the felt layer with its outer edges bent upwardly to form a watertight seal along the butted-together side edges of the strip.

The water retarding grip of the present invention may utilize sidewardly and outwardly curved, reinforcement, traction side edges along its length. Such side reinforcement edges inhibit unraveling of the grip from the golf club shaft enhance the frictional grip of the user, provides an improved appearance over existing grips, and reduces interference with other golf club grips as a club is withdrawn from a golfer's bag. The water retarding grip of the present invention may either be used as a replacement grip or alternatively be fabricated as original equipment by a manufacturer of golf clubs or golf club grips.

The water retarding golf club grip of the present invention has been found to greatly cushion the shock transferred from a golf club to a golfer's body and thereby prevent the danger of injury to a golfer during a golf swing. Yet, the water retarding golf club grip of the present invention can be made lighter than conventional grips to reduce the grip weight of a golf club and the total weight of the club permitting the re-distributing of the weight to the golf club head, thereby increasing the moment of inertia of the club. In this manner there is achieved an increase in clubhead speed with a corresponding distance of travel of a golf ball.

These and other features and advantages of the present invention will become apparent from the following detailed description when taken in conjunction with the accompanying drawings.

BRIEF DESCRIPTION OF THE DRAWINGS

FIG. 1 is a top plan view of a polyurethane and felt element of a strip utilized in a preferred form of water retarding golf club grip embodying the present invention;

FIG. 2 is a top plan view of a double-sided adhesive tape used with the strip shown in FIG. 1 to form a water retarding grip of the present invention;

FIG. 3 is a top plan view of the strip adhered to the adhesive tape;

FIG. 4 is a top plan view showing the edges of the adhesive tape extended upwardly over the side edges of the polyurethane and felt element;

FIG. 9 is a broken side elevational view showing how the strip of FIGS. 1–8 is spirally wrapped about the grip-receiving portion of a golf club shaft;

FIG. 10 is a sectional view taken in further enlarged scale along line 10—10 of FIG. 9;

FIG. 11 is a view similar to FIG. 9 showing a cap utilized with the aforedescribed water retarding grip;

FIG. 12 is a sectional view taken in further enlarged scale along line 12—12 of FIG. 11;

FIG. 13 is a perspective view showing a rubber-like sleeve affixed to the grip-receiving portion of a golf club shaft;

FIG. 14 is a side elevational view showing the aforedescribed strip being spirally wrapped about the sleeve of FIG. 13;

FIG. 15 is a sectional view taken in enlarged scale along line 15—15 of FIG. 14;

FIG. 16 is a reduced perspective view showing a golf club to which is secured a water retarding golf club grip of the present invention;

FIG. 17 is a vertical sectional view showing a heat-applying platen utilized to form recessed traction reinforcement side edges on a second form of water retarding grip embodying the present invention;

FIG. 18 is a vertical sectional view showing the water retarding grip formed by the heat-applying platen of FIG. 17; and FIG. 19 is a vertical sectional view similar to FIG. 10 showing the water retarding strip of FIG. 18 spirally wrapped about the golf club shaft of FIG. 9.

DETAILED DESCRIPTION OF PREFERRED EMBODIMENTS

Referring to FIGS. 1–16 of the drawings, a preferred form of water retarding golf club grip G embodying the present invention utilizes an elongated resilient strip S, which is spirally wrapped about the grip receiving portion of a golf club shaft 20 to define the grip G, as shown in FIGS. 9, 11, and 16. Alternatively, the strip S may be spirally wrapped about a resilient rubber-like sleeve 22, as shown in FIGS. 13 and 14. A second form of water retarding grip G' embodying the present invention is shown in FIGS. 17–19.

Figure 5:
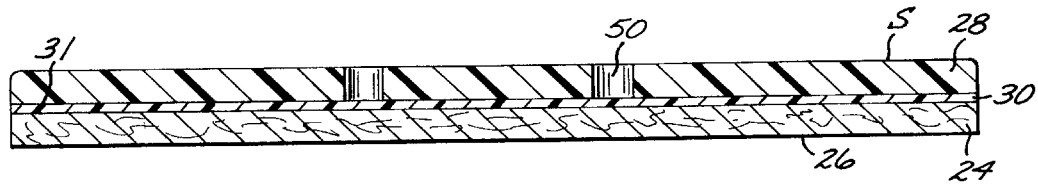
FIG. 5 is a sectional view taken in enlarged scale along line 5—5 of FIG. 1.
Figure 6:
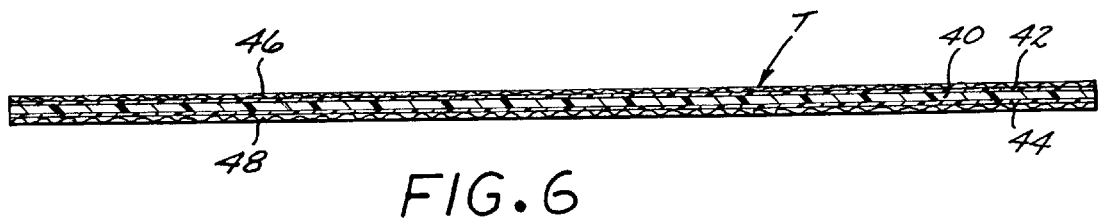
FIG. 6 is a sectional view taken in enlarged scale along line 6—6 of FIG. 2.

More particularly as shown in FIG. 5, elongated strip S includes a porous felt layer, generally designated 24, having an inner or bottom surface 26 which is adhered to the golf club shaft 20, by a conventional watertight double-sided adhesive tape T, an outer closed pore polyurethane layer 28 and a water retarding layer 30 integrally sandwiched between the outer polyurethane layer 28 and felt layer 24. Preferably, water retarding layer 30 is also formed of a polyurethane.

The outer polyurethane layer 28 provides a shock absorbing cushioned grasp of the player's hand on golf club grip G, and also enhances the player's grip by providing increased tackiness between the player's hands and the grip. The felt layer 24 provides strength to the outer polyurethane layer and intermediate water resistant layer 30 serves as a means for attaching the bonded-together strip to golf club shaft 20, or to the sleeve 22 of FIG. 13. Water retarding polyurethane layer 30 restrains water from passing through the outer polyurethane layer 28 into the felt layer 24. The felt layer 24 has its upper surface 31 bonded to the lower surface of the water retarding polyurethane layer 30. The upper surface of the water retarding layer 30 is in turn bonded to the lower surface of the outer polyurethane layer 28. As indicated in FIG. 10, the outer polyurethane layer 28 is formed in a conventional manner (described in my above-referenced patents) with pores 36 which extend vertically, i.e. generally normal to the longitudinal axis of the strip S and golf club shaft 20 when the grip G has been affixed to such shaft.

A suitable formula for the water retarding polyurethane layer 30 is as follows:

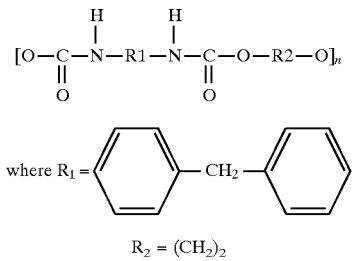

The water retarding polyurethane layer 30 is coated over the upper surface of the felt layer 24. The outer polyurethane layer 28 is formed over the water retarding polyurethane layer 30 in a conventional manner. Utilizing this method, there is formed the integral three layer strip S shown particularly in FIGS. 5 and 10. It has been found that satisfactory results can be obtained where the thickness of the felt layer 24 is between 0.4–3.0 millimeters, the thickness of the water resistant layer 30 is approximately 0.1 millimeter, and the thickness of the outer polyurethane layer 28 is approximately 0.1–1 millimeter. The thickness of the completed grip may be about 0.5–3.9 millimeters.

Referring to FIG. 10, it should be noted that the provision of the pores 36 in the outer polyurethane layer 28 greatly increases the compressibility of the grip when grasped by a golfer. In this manner, increased shock absorbing characteristics are achieved, while the player is able to maintain a tight grasp of the grip to provide maximum control over the golf club. In this regard, applicant has discovered that greatly improved shock absorbing qualities may be obtained in a golf club grip where the ratio of the thickness of the polyurethane layer to the thickness of the felt layer is increased over the ratios employed in prior art grips. More specifically, applicant considers that the ratio of the thickness of the polyurethane layer to the textile layer should be a minimum of approximately 0.18 in order that pores 36 may be formed in the outer polyurethane layer. Excellent results have been obtained with this ratio, since the pores 36 permit the outer polyurethane layer to be readily compressed by the gripping force of a golfer's hands when making a swing.

Figure 7:
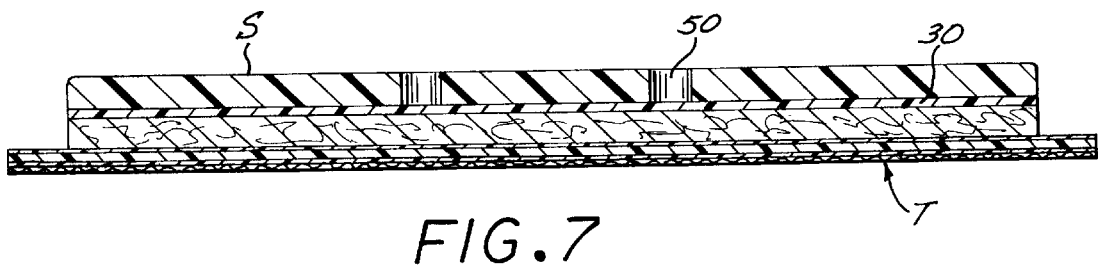
FIG. 7 is a sectional view taken in enlarged scale along lines 7—7 of FIG. 3.
Figure 8:
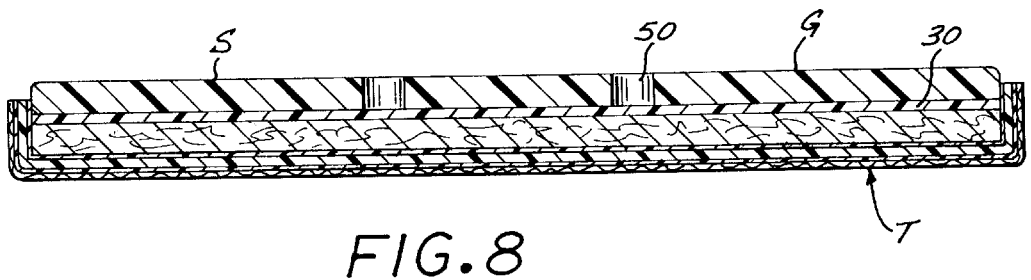
FIG. 8 is a sectional view taken in enlarged scale along lines 8—8 of FIG. 4.

Referring to FIGS. 2 and 3, the tape T of FIG. 2 is trimmed along its butt and trailing edges to conform to the configuration of strip S. Tape T includes a felt body 40 coated on its first side with a watertight adhesive layer 42 and its second side by a second watertight adhesive layer 44. First adhesive layer is initially covered by a first peel-off removable protective paper 46, while second adhesive layer 44 is initially covered by a second peel-off removable protective paper 48. The upper or first side of the tape T is adhered to the underside of the felt layer 24 after the first protective paper 46 has been peeled off the first adhesive layer 42, as shown in FIG. 7. Thereafter, as indicated in FIG. 8, the side portions of the tape T will be bent upwardly over the sides of the strip S. Preferably, the side portions of the tape T will extend upwardly over felt layer 24 to approximately the mid-portion of the outer polyurethane layer 28.

The outer polyurethane layer 28 is formed with a plurality of apertures such as perforations 50, which extend from the exterior surface of the outer polyurethane layer to the upper surface of the water retarding polyurethane layer 30. Such perforations enhance the absorption rate of perspiration from a user's hands.

As indicated in FIGS. 1 and 4, the starting or butt end 52 of strip S is cut away at an angle to define a tongue 54. An inwardly extending notch 56 is formed at the inner portion of the tongue. The trailing edge of the strip is also cut away at an angle to define a second tongue 58. The tongue and notch dimensions will differ depending on the dimensions of the butt end of the particular golf club shaft receiving the grip.

Referring now to FIGS. 9–11, to apply the strip S to the golf club shaft 20, the first removable paper 48 is peeled off the second adhesive 44 on the underside of the felt layer 24. The strip S is then spirally wound around the shaft 20 starting with the butt end 54 of the shaft. As indicated in FIG. 9, the point of starting end (relative to the shaft's butt end) of tongue 54 fits snugly within the notch 56 so as to provide a smooth configuration of the strip S relative to the exterior of the golf club shaft 20. After the strip S has been completely wound about the shaft, its lower end may be secured in place by finishing tape (not shown) and/or a conventional ferrule to prevent unraveling of the lower portion of the strip relative to the shaft. It should be noted that second tongue 58 permits the strip's trailing end to provide a smooth transition of the strip to the golf club shaft. As indicated in FIG. 10, the side edges of the strip S do not overlap, and, instead, their radially extending surfaces butt tightly against one another, as shown at 62. Such tight abutting configuration increases the resistance against unraveling of the strip S relative to the golf club shaft. Further resistance against unraveling is afforded by adhesive contact of the bent-over edges 63, 64 of the tape T.

Referring to FIGS. 11 and 12, after the strip S has been spirally wrapped around golf club shaft 20, an annular cap C of integral construction should be positioned over the open upper end of the golf club shaft. Cap C includes a vertical innerskirt 66, a vertically tapered outer skirt 68, and a horizontal, slightly domed cover 70. The cover is preferably molded from a stiff synthetic plastic material such as polypropylene, polyethylene or ABS. A vertically extending expansion slot 70 is formed in inner skirt 66. It is desirable that the inner skirt taper at about the same angle as the interior of golf club shaft 20 and be tightly telescopically received by the open upper end of such shaft. Expansion slot 70 permits a tight fit to be obtained between the inner skirt and the interior of the golf club shaft even where the outer diameter of the inner skirt is slightly greater than the shaft's inner diameter. As indicated in FIG. 12, a length of the aforedescribed double-sided tape T may be encircled about the upper interior surface of the golf club shaft after the second protective paper 48 has been peeled off. The tape then will be bent horizontally outwardly over the upper periphery of the shaft and the grip and adhered in place. Thereafter, the first paper 46 will be peeled off the body 40 and the cap C is forced downwardly into the telescopic relation with the golf club shaft and strip S as depicted in FIG. 12. It is important that the outer skirt 68 extend downwardly a sufficient distance over the upper portion of the spirally wrapped strips to ensure the strip does not unravel relative to the shaft 20 when a golf club is being used in play, and particularly when the club is being removed from and returned to a golf bag by contact with other golf clubs in the bag. The configuration of the cap and sleeve facilitates inserting and withdrawing a golf club from a golf bag.

Referring now to FIGS. 13 and 14, the aforedescribed strip S is shown being spirally wrapped about the resilient rubber-like sleeve 22. Sleeve 22 is of synthetic plastic foam or rubber construction utilizing an integral cap 74. The lower of portion of sleeve 22 is formed with an enlarged diameter guide cylinder 76. The sleeve 22 is shown slipped over the handle portion of golf club shaft 20, with the underside of the cap 74 abutting the top of the shaft. Strip S is spirally wrapped about sleeve 22 with the side edges of the strip and bent-over tape edges being disposed in tight abutment, as indicated at 78 in FIG. 15. The spirally wound strip S extends from the underside of the cap 74 to the top of the guide cylinder 76. As indicated in FIG. 14, the tongue 54 will be smoothly received within the notch 56 to provide a smooth configuration of the upper portion of the strip on the sleeve. Finishing tape (not shown) may be interposed between the lower portion of the strip S and the guide cylinder 76 to prevent unraveling of the strip relative to the sleeve. It should be noted that rather than wrapping the strip S about the sleeve 22 after the sleeve has been applied to a golf club shaft, the sleeve may be mounted on a tapered mandrel (not shown) and the strip spirally wrapped about the sleeve. The resulting grip may be marketed as a replacement slip-on grip or as original equipment installed on a complete golf club. The guide cylinder 76 will facilitate forcing the sleeve onto the golf club shaft.

In FIG. 18, the strip S is shown being formed with sidewardly and outwardly extending recessed reinforcement side traction edges, generally designated 80 and 82. The reinforcement side edges are preferably formed along the major portion of the strip by means of a heated platen H shown in FIG. 17. Referring thereto, platen H may be of conventional metal construction having a horizontal base 84 formed at its opposite sides with depending legs 85 and 86. The lower ends of the legs are configured so as to define the recessed reinforcement side edges 80 and 82. Thus, the lower portion of the legs are provided with like-configured mirror image cavities each having a horizontally extending surface, the inner portions of which extend upwardly and inwardly, while the outer edges thereof are curved sidewardly and downwardly. The platen H is heated in a conventional fashion as by means of electrical resistance elements (not shown) and urged downwardly against the sides of the strip S so as to compress side portions of the outer polyurethane layer 28 below the upper surface of such layer in the manner shown in FIG. 17 to define the recessed reinforcement side edges. Such compression increases the density and hence the strength of the outer polyurethane layer in the vicinity of its side edges. It has been found that the width of the recessed reinforcement traction side edges 80 and 82 may be approximately 2 millimeters, while the depth of the major portion thereof may approximate 0.5 millimeters. The traction edges 80 and 82 further inhibit unraveling of the strip S' from the golf club shaft (or sleeve), enhance the frictional grip of the user's hands, provides an improved appearance over conventional grips, and further reduces interference with other golf clubs as a club is withdrawn from a golfer's bag.

It is critical to note that the adhered-together bent-over edges 63 and 64 of tape T serve to positively restrain entry of water into felt layer 24, at the butt seams 78 by the watertight adhesive coatings of the tape, as shown particularly in FIGS. 10, 15, and 16.

It has been found by tests that a polyurethane-felt grip of my design without a water resistant layer and adhesive tape bent-over contact edges will absorb about 10–11 grams of water, as compared to about 34 grams of water by a grip of the present invention. The 3–4 grams of water are absorbed solely by the outer polyurethane layer, but such water is restrained from contact with the felt layer by water resistant layer 30 and the adhesive tape bent-over contact edges. The 34 grams of water can be dried in about 5 minutes, while about 5 hours is required to dry the 10–11 grams absorbed by the grips of my previous design. The 34 grams of water can be quickly removed by merely wiping off any moisture accumulating on the grip by means of a towel. Accordingly, a water retarding grip of the present invention has the ability to stay sufficiently dry during rainy conditions that the golfer may continue his golf play without interruption.

Various modifications and changes may be made with respect to the aforedescribed description without departing from the spirit of the present invention of the present invention or the scope of the following claims.

What is claimed is:

1. A grip for a golf club shaft, said grip comprising:
   a strip which includes an open-pored felt layer, a thin layer of water resistant material, and a smooth closed-pore outer polyurethane layer;
   the thin layer of water resistant material being interposed between the outer polyurethane layer and the felt layer;
   the felt layer having its upper surface bonded to the lower surface of the layer of water resistant material;
   the upper surface of the water resistant material being bonded to the lower surface of the polyurethane layer,
   with the felt layer providing strength for the polyurethane layer while the polyurethane layer absorbs shocks and provides tackiness so as to inhibit slippage of a user's hand relative to a shaft;
   a tape on the underside of the felt layer and bent over the sides of the felt layer to adhere the felt layer to a golf club shaft and to restrain the entry of water into the felt layer; and
   with the strip being spirally wrappable about a shaft with the side edges of said tape being in watertight abutment.

2. The golf club shaft grip of claim 1, wherein the ratio of thickness of the outer polyurethane layer to the felt layer is about 0.18.

3. The golf club shaft grip of claim 1, wherein the water resistant layer is a polyurethane layer.

4. The golf club shaft grip of claim 1, wherein the outer polyurethane layer is formed with perforations.

5. The golf club shaft grip of claim 1, which further includes a resilient golf club shaft-receiving sleeve, and the strip is spirally wrapped about and adhered to said sleeve.

6. The golf club shaft grip of claim 1, wherein the side edges of the outer polyurethane layer are compressed to define recessed reinforcing traction edges.

7. The golf club shaft grip of claim 2, which further includes a resilient shaft-receiving sleeve, and the strip is spirally wrapped about and adhered to said sleeve.

8. The golf club shaft grip of claim 2, wherein the side edges of the outer polyurethane layer are compressed to define recessed reinforcing traction edges.

9. The golf club shaft grip of claim 3, which further includes a resilient golf club shaft-receiving sleeve, and the strip is spirally wrapped about and adhered to said sleeve.

10. The golf club shaft grip of claim 4, wherein the side edges of the outer polyurethane layer are compressed to define recessed reinforcing traction edges.

11. The combination of a golf club shaft and a resilient grip, said combination comprising:
    a strip having a thin layer of water resistant material, and a smooth closed-pore outer polyurethane layer, the thin layer of water resistant material being interposed between the outer polyurethane layer and the felt layer, and the felt layer having its upper surface bonded to the lower surface of the layer of water resistant material;
    the upper surface of the water resistant material being bonded to the lower surface of the polyurethane layer,
    with the felt layer providing strength for the polyurethane layer while the polyurethane layer absorbs shocks and provides tackiness so as to inhibit slippage of a user's hand relative to a shaft;
    adhesive on the underside of the felt layer and extending over the sides of the felt layer to adhere the felt layer to the golf club shaft and to restrain the entry of water into the felt layer; and
    with the strip being spirally wrapped about a shaft with the side edges of said tape being in watertight abutment.

\* \* \* \* \*